(12) United States Patent
Rao

(10) Patent No.: US 10,045,062 B2
(45) Date of Patent: *Aug. 7, 2018

(54) NETWORKED PERSONAL VIDEO STORAGE AND DELIVERY

(71) Applicant: Sling Media Inc., Foster City, CA (US)

(72) Inventor: Padmanabha R. Rao, Palo Alto, CA (US)

(73) Assignee: SLING MEDIA INC., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/804,672

(22) Filed: Nov. 6, 2017

(65) Prior Publication Data

US 2018/0070124 A1 Mar. 8, 2018

Related U.S. Application Data

(63) Continuation of application No. 15/221,922, filed on Jul. 28, 2016, now Pat. No. 9,813,750, which is a
(Continued)

(51) Int. Cl.
| | |
|---|---|
| *H04N 7/16* | (2011.01) |
| *H04N 21/4147* | (2011.01) |
| *H04N 21/41* | (2011.01) |
| *H04N 21/4363* | (2011.01) |
| *H04N 21/4627* | (2011.01) |
| *H04N 21/4402* | (2011.01) |
| *H04N 21/436* | (2011.01) |
| *H04N 21/414* | (2011.01) |

(Continued)

(52) U.S. Cl.
CPC ..... *H04N 21/4147* (2013.01); *H04N 21/4126* (2013.01); *H04N 21/41407* (2013.01); *H04N 21/4363* (2013.01); *H04N 21/4367* (2013.01); *H04N 21/43622* (2013.01); *H04N 21/43632* (2013.01); *H04N 21/43637* (2013.01); *H04N 21/4402* (2013.01); *H04N 21/4405* (2013.01); *H04N 21/440218* (2013.01); *H04N 21/440236* (2013.01); *H04N 21/4516* (2013.01); *H04N 21/4627* (2013.01)

(58) Field of Classification Search
CPC ....... H04N 21/43615; H04N 21/43637; H04N 21/4126; H04N 21/41407; H04N 21/4147
See application file for complete search history.

(56) References Cited

U.S. PATENT DOCUMENTS 8,745,388 B2 * 6/2014 Kanungo ............ H04L 63/0435
380/210
9,160,974 B2 * 10/2015 Shah ..................... H04N 7/1675
(Continued)

*Primary Examiner* — Oleg Asanbayev
(74) *Attorney, Agent, or Firm* — Lorenz & Kopf, LLP

(57) ABSTRACT

A portable video delivery device includes data storage, a secure processor, and a wireless network interface that acts as an access point for a secure personal wireless network. Transcoded media files are stored in the data storage so that the portable device maintains a library of stored media programs that can be carried along with the user during commuting, travel and/or other activities. To playback the stored programming, other media player devices use the personal wireless network to securely connect to the portable device and to obtain previously-transcoded content from the data storage of the device.

17 Claims, 2 Drawing Sheets

Figure 1:
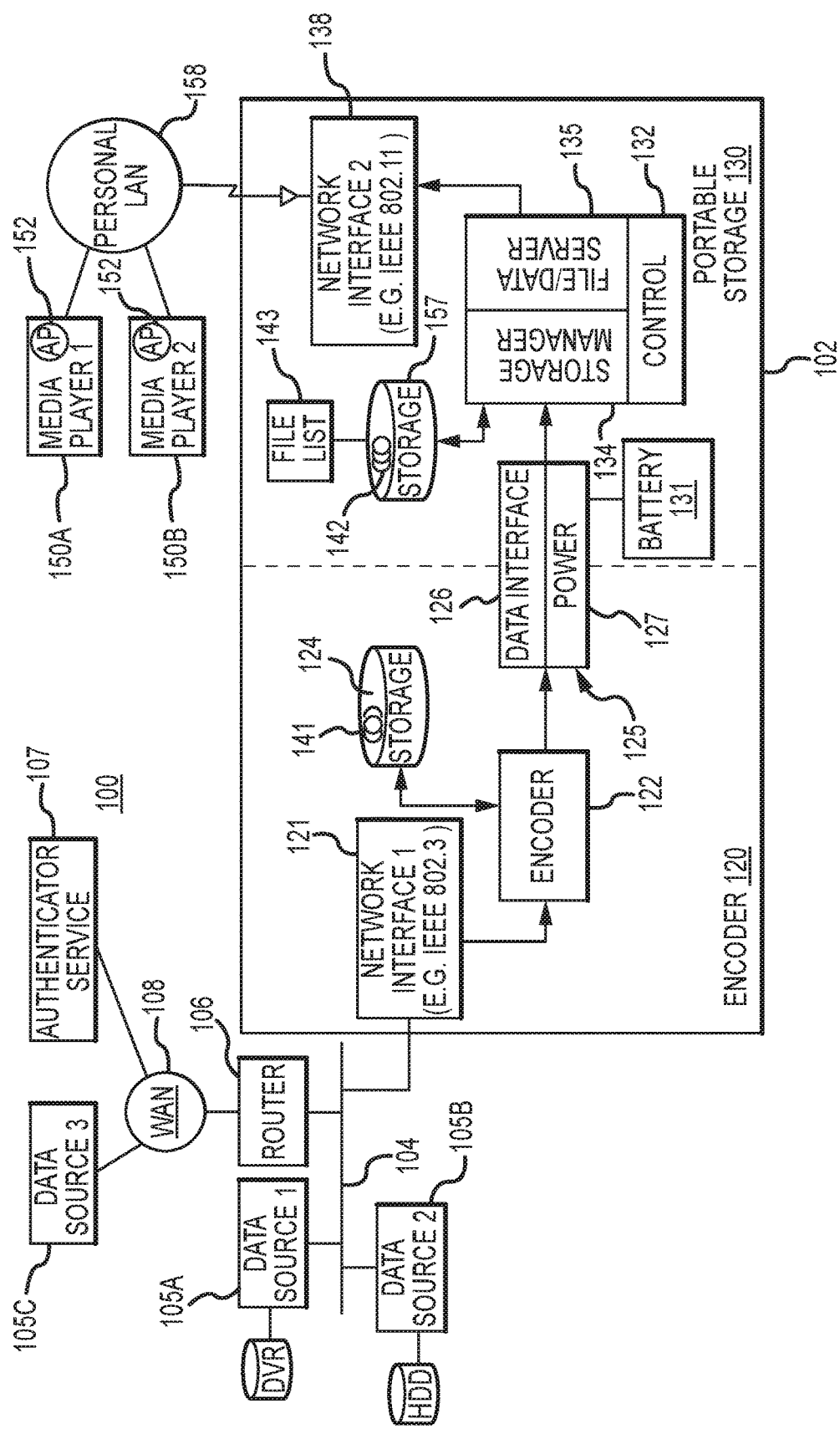

Related U.S. Application Data continuation of application No. 15/057,390, filed on Mar. 1, 2016, now Pat. No. 9,479,816, which is a continuation of application No. 14/266,232, filed on Apr. 30, 2014, now Pat. No. 9,307,289.

(51) Int. Cl.
*H04N 21/4405* (2011.01)
*H04N 21/45* (2011.01)
*H04N 21/4367* (2011.01)

(56) References Cited

U.S. PATENT DOCUMENTS

| | | | |
|---|---|---|---|
| 2003/0059047 A1* | 3/2003 | Iwamura | H04N 5/76 380/201 |
| 2005/0063541 A1* | 3/2005 | Candelore | H04N 7/165 380/239 |
| 2006/0198320 A1* | 9/2006 | Hsu | H04L 29/12009 370/254 |
| 2008/0075095 A1* | 3/2008 | Suryanarayana | H04L 29/06027 370/401 |
| 2008/0263623 A1* | 10/2008 | Hildebrand | H04N 7/17309 725/152 |
| 2012/0141092 A1* | 6/2012 | Friedman | H04N 9/8042 386/248 |

* cited by examiner

NETWORKED PERSONAL VIDEO STORAGE AND DELIVERY

PRIORITY CLAIM

This application is a continuation U.S. patent application Ser. No. 15/221,922 which was filed on Jul. 28, 2016, which is a continuation of U.S. patent application Ser. No. 15/057,390, which was filed on Mar. 1, 2016. That application is a continuation of U.S. patent application Ser. No. 14/266,232, which was filed on Apr. 30, 2014.

TECHNICAL FIELD

The present disclosure generally relates to storage and delivery of personal video content. More particularly, the following discussion relates to devices, methods and systems that provide portable storage and wireless retrieval of personal video content.

BACKGROUND

Television viewers are no longer confined to their home television sets. With the advent of time and place shifting techniques, viewers can now view their favorite television programs and other media content at virtually any time and from virtually any place. Personal video recorders (PVRs) and other time shifting devices are becoming increasingly ubiquitous. Additionally, many television viewers now use placeshifting devices to stream their television programs to mobile phones, tablets, personal computers, personal digital assistants, game players and/or other devices other than traditional television sets. Modern television viewers now expect to watch television at times and in places that were not previously thought possible.

As television viewing becomes increasingly mobile, various challenges can be encountered. For example, many portable media players lack sufficient storage capacity to store all of the media content that a user may want to watch. Video content can quickly consume a large amount of storage, so most users have to choose a relatively small amount of video content to carry in their phone, tablet or other personal device at any particular time. The limited storage severely restricts the choice of content that is available when the user is away from home, and it also requires relatively frequent updates to maintain a fresh store of unwatched content.

Placeshifting or other media streaming over telephone or data networks can improve the availability of content, but streaming may be very difficult in some locations (e.g., in aircraft, vehicles or other remote locations where networks are unavailable, or in hotels or other busy areas where networks are too overloaded to provide adequate bandwidth for video streaming). Even when adequate networks are available, video streams can consume a relatively large amount of bandwidth, thereby limiting the quality of the received stream and/or potentially incurring substantial cost to transfer an entire program. Moreover, it is important to protect the intellectual property rights of content owners even as the content is being viewed in non-traditional places and times.

It is therefore desirable to create systems, devices and methods for providing a variety of streaming media content to portable devices in a convenient yet secure manner. These and other desirable features and characteristics will become apparent from the subsequent detailed description and the appended claims, taken in conjunction with the accompanying drawings and this background section.

BRIEF SUMMARY

Various exemplary embodiments provide systems, devices and methods to provide convenient yet effective portable media streaming. In various embodiments, a portable device suitably comprises a network video transcoder, data storage and a network server interface for providing a personal local area network (LAN). The transcoder receives video programs from personal computers, television receivers, set top boxes, online media services and/or other sources and encodes/transcodes the received content into a format that is suitable for streaming over the personal LAN. The personal LAN may be a wireless network that is hosted by the portable storage device to allow subsequent video streaming of the previously-stored transcoded content to one or more client devices. The security of stored content can be protected through authentication, periodic check-ins, and/or other techniques as appropriate.

More particularly, some embodiments provide a portable device to deliver video streams to at least one media player device suitably comprising a transcoder, a data storage, a wireless network interface, and a processor. The transcoder is configured to receive video content and to transcode the received video content into a format that is suitable for delivery to the at least one media player over a personal wireless network. The data storage is configured to store the transcoded video content, and the wireless network interface is configured to provide a wireless access point to the personal wireless network. The processor is configured to receive connection requests from the at least one media player device via the personal wireless network and to deliver the transcoded video content to the at least one media player device via the personal wireless network.

Other embodiments provide methods executable by a portable video storage device to deliver video content to a media player. The method suitably comprises receiving a digital credential from an authentication service at the portable video storage device, wherein the digital credential identifies the media player; storing transcoded video content in a data storage of the portable video storage device; providing a wireless access point to a personal wireless network by the portable video storage device; receiving a connection request from the media player at the portable video storage device via the personal wireless network, wherein the connection request comprises the digital credential identifying the media player; and if the digital credential received from the media player matches the digital credential received from the authentication service, the portable video storage device providing the transcoded video content from the portable video storage device to the media player device via the personal wireless network.

Still other embodiments provide a portable device that interfaces with a video transcoder to deliver video streams to at least one media player device. The portable device suitably comprises a memory, hard drive or other data storage, a Wi-Fi or other wireless network interface, and a processor. The data storage is configured to store transcoded video content, and the wireless network interface is configured to provide a wireless access point to the personal wireless network. The processor is configured to receive connection requests from the at least one media player device via the personal wireless network and to deliver the transcoded video content to the at least one media player device via the personal wireless network.

These examples and other embodiments, aspects and features are described in detail below.

BRIEF DESCRIPTION OF THE DRAWING FIGURES

Figure 2:
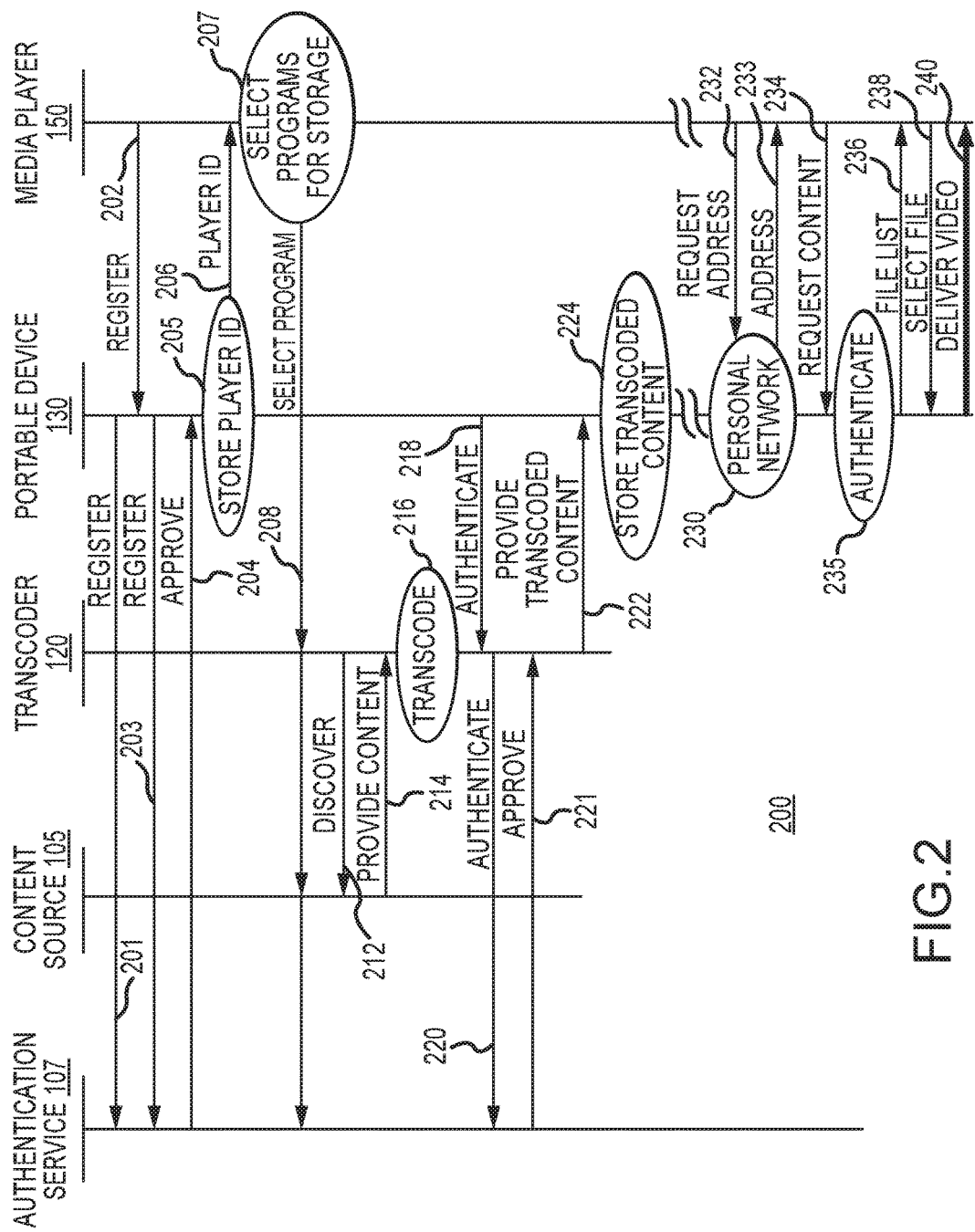

Exemplary embodiments will hereinafter be described in conjunction with the following drawing figures, wherein like numerals denote like elements, and FIG. 1 is a block diagram of an example system for providing personal video streaming with a portable storage device; and FIG. 2 is a flowchart of an example method to provide personal video streaming with a portable storage device.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

According to various embodiments, a portable video delivery device includes data storage, a secure processor, and a wireless network interface that acts as an access point for a personal wireless network. Transcoded media files are stored in the data storage so that the portable device maintains a relatively large library of stored media programs that can be carried along with the user during commuting, travel and/or other activities. To playback the stored programming, other media player devices (e.g., mobile telephones, media players, video game players, tablet computers, personal computers and/or the like) use the personal wireless network to connect to the portable device and to obtain previously-transcoded content from the data storage of the device. The content may be provided in a streaming format, as a side-loaded data file, and/or in any other format as desired. Further implementations may implement data security to prevent further duplication and unauthorized use of the programming stored on the portable device. Parental controls and other features may also be provided.

The portable device therefore provides storage of a relatively large amount of transcoded video content as well as wireless retrieval of the video content to one or more video playback devices. This wireless retrieval may allow, in some embodiments, multiple playback devices to simultaneously receive separate video streams of different stored programs. If a family was travelling together in a car, plane or other vehicle, for example, each member of the family could simultaneously obtain a personal video stream of a different program stored on the portable device, even if a streaming connection to the Internet or another network was not readily available. The portable device therefore provides many of the benefits of a network-based streaming service, but with fewer bandwidth and access constraints.

At least two variants of a portable storage device are described herein. In the first variant, the portable device includes an encoder or transcoder within a common chassis or housing as the data storage and wireless interface. The transcoder suitably receives video content from computers, television receivers, network services and/or the like. The video content is converted into a suitable format for later streaming or side-loading prior to storage so that the converted content can later be retrieved and played back.

In the second variant, the portable device does not necessarily include transcoding hardware itself, but rather interfaces with a separate encoder or transcoder device to receive transcoded programming that can be stored and transported for later viewing. In this variant, the portable device interfaces with a transcoder provided within a set top box, television receiver, placeshifting device, digital video recorder (DVR) and/or the like, or in a standalone network transcoding device that receives video content from other sources. The properly formatted video is provided to the portable device via a suitable interface so that the transcoding hardware need not be carried along with the portable device, thereby reducing the size, complexity and power consumption of the portable device. In various embodiments, the security of the content can be preserved by authenticating the portable device and/or the users' media players to the transcoder and/or to a suitable authentication service, as desired. Other variations and equivalent embodiments could be formulated, many of which are described below.

Turning now to the drawing figures and with initial reference to FIG. 1, an example of a system 100 for processing video content for portable storage and playback suitably includes a media storage device 102 that receives video content, stores transcoded content in a data storage 137, and that provides a personal wireless network 158 via a network interface 138. Device 102 may interact with an authentication service 107 on network 108 or elsewhere to maintain the security of system 100, as described more fully below.

In the example illustrated in FIG. 1, device 102 suitably includes a transcoder portion 120 and a storage portion 130. As noted above, some variants of device 102 may include a transcoder 122 that transcodes received video content for subsequent streaming and/or file transfer ("side loading") to one or more media players 150A-B via personal network 158. Other variants may provide the functions of transcoder portion 120 within a separate device, such as a television receiver, STB, placeshifting device, DVR, standalone network transcoder device and/or the like.

The storage portion 130 of portable device 102 suitably includes a processor 132, data storage 137, and a wireless network interface 138. Data storage 137 may be any sort of solid state, magnetic, optical or other data storage capable of storing transcoded video programs 142. Data storage 137 may be implemented using one or more flash memories, SDRAMs, hard disk drives and/or the like, to provide just a few examples. Some embodiments may incorporate removable storage, such as microSD, miniSD, or other memory cards, as desired.

Wireless network interface 138 suitably includes an antenna and other appropriate hardware and software to host a personal local area network 158. In various embodiments, personal network 158 is an IEEE 802.11 ("Wi-Fi") network that can be readily joined by any number of conventional computers, phones, tablets, media players and/or other devices. The network may be password protected, encrypted and/or otherwise secured to protect against unauthorized access. In various embodiments, personal LAN 158 is primarily used to provide video content from device 102 to client devices 150A-B. It may not be necessary that LAN 158 have access to the Internet or any external networks to support video transfers; indeed, device 102 may be of convenient use in vehicles or in other settings where WAN access might not be readily available.

Processor 132 provides a storage manager function 134, a data server function 135, and control functions as appropriate. In various embodiments, each function 134 and 135 is implemented in software or firmware stored in memory and executed by processor 132. Various embodiments implement processor 132 and its various functions 134, 135 using a system-on-a-chip (SOC) processor that includes appropriate processing circuitry, memory and input/output features as needed. Processor 132 may be a secure processor that includes encrypted memory portions (e.g., using AES-128 or similar encryption) to protect against hacking or reverse engineering. Other embodiments may provide equivalent functions in a conventional microprocessor, microcontroller, digital signal processor, ASIC, programmable logic array and/or other hardware, as desired.

Electric power for processor 132, storage 137 and network interface 138 may be provided in any manner. In various embodiments, a battery 131 is provided to facilitate operation in vehicles, while commuting and/or in other settings where electricity may not be conveniently available. Other embodiments may receive electrical power through a conventional power source (e.g., a power supply that receives electricity from a conventional AC outlet or the like).

In the embodiment shown in FIG. 1, the portable storage portion 130 receives electrical power through a detachable interface 125 to transcoder portion 120. Interface 125 may be, for example, a universal serial bus (USB) connector, LIGHTNING connector, or the like that provides interfaces 126 and 127 for providing data and electricity (respectively) to storage portion 130, as appropriate. In this example, electrical power received via interface 127 could recharge battery 131 as needed, and/or supplement power supplied by battery 131. Interface 127 could also supply electrical power from an external power source such as an electrical outlet, a USB battery, a USB slot of a personal computer or the like if transcoder portion 120 is not available, as desired. As noted above, some implementations may provide transcode portion 120 and storage portion 130 in a common unit; in such embodiments, there would be no need to physically separate portions 120 and 130 from each other, so interface 125 may not be needed. Alternatively interface 125 may be a conventional data bus that transfers data from transcoder 122 for storage in portion 130, but that may not supply electrical power between portions 120 and 130.

Transcoder portion 120 suitably includes a transcoding processor 122 and a network interface 121 to a home or other local area network 104. In the example shown in FIG. 1, interface 121 is an IEEE 802.3 interface to a conventional ETHERNET network; equivalent embodiments may use other interfaces, including WI-FI or other wireless interfaces as desired. In some implementations, interface 121 may be eliminated or combined with wireless interface 138 in any manner.

Transcoding processor 122 is any processing hardware and software capable of transcoding media programming into a digital format that can be delivered via personal network 158. Different embodiments may support any number of different formats, including any formats for streaming or side-loading, as desired. In various embodiments, transcoding techniques generally used for placeshifting could be applied. Unlike placeshifting techniques that adapt the transcoding of the media stream in response to then-current network conditions, however, suitable default transcoding parameters may be selected in many settings to reflect that network 158 is more predictable that most connections that support traditional placeshifting, and to reflect that transcoding occurs prior to streaming in this instance. Transcoding may nevertheless involve converting the received media content from formats typically associated with DBS, cable, terrestrial broadcasts (e.g., MPEG) and/or formats typically used for storage in a DVR or the like into a format that is suitable for streaming on a digital network. Such conversion may involve translation from one digital encoding format to another, as well as any appropriate compression and/or encryption to preserve the security of the underlying content. Other actions may be additionally or alternately performed as part of the transcoding function.

Various embodiments of transcoder 120 may include storage 124 for storing pre-encoded video programs 141 and/or transcoded video programs 142 as desired. Programming content to be transcoded may be manually or automatically obtained from any number of content sources 105A-C that are accessible via interface 121. In the example of FIG. 1, content source 105A is a television receiver with a DVR that stores programs recorded by the user, and content source 105B is a personal computer with a hard drive that includes stored media programs. Both content sources 105A-B may execute software applications that interact with transcoding portion 120 to manually and/or automatically transfer content over network 104 for transcoding. Content may also be received from a video-on-demand (VOD), remote storage digital video recorder (RSDVR), or other source 105C accessible via the Internet or another wide area network 108.

Un-transcoded programs 141 obtained from content sources 105A-C may be temporarily stored in storage 124 prior to transcoding. After transcoding, the transcoded video content 142 may be temporarily stored in storage 124 if storage portion 130 is detached or otherwise not immediately available. When storage portion 130 is in contact with transcoder portion 120, transcoded media content is transferred via interface 125 to transcoder portion for storage in data storage 137.

The storage manager 134 manages the transcoded programming 142 stored in storage 137. In various embodiments, storage manager 134 maintains a list 143 of all of the stored programs 142. This list 143 can be supplied to media player client applications 152 to provide a directory of programs available for retrieval or streaming via network 158, as described more fully below.

In some implementations, a secure processor 132 of storage portion 130 authenticates with transcoder 122 and/or authentication service 107 on a repeating basis (e.g., daily, monthly, etc.) to maintain the integrity of system 100. Client applications 152 executing on media players 150A-B may also authenticate with processor 132, transcoder 122 and/or authentication service 107, as described more fully below.

In operation, then, storage manager 134 directs the storage of transcoded program files 142 on storage 137 and data server 135 provides access to stored files 142 via network 158. In various embodiments, data server 135 is based upon conventional hypertext transport protocol (HTTP) constructs similar to a conventional web server. This allows client applications 152 to request file list 143, to select programs available from the list, and to receive streams or files that include the requested programming via the personal network 158.

The security and integrity of system 100 may be protected in any number of different ways. As noted above, processor 132 may include encrypted memory regions to protect against reverse engineering and discovery of encryption keys or other secure data. Transcoded content 143 may be secured with digital rights management (DRM) or persistent rights management (PRM) such as the MEDIAACCESS PRM product available from Nagra Kudelski of Cheseaux-sur-Lausanne, Switzerland, although other cryptography, DRM or PRM products could be used in any number of equivalent embodiments. Further embodiments could require the registration of client applications 152, users and/or client devices 150A-B with transcoder 122 and/or authentication service 107 prior to use. Storage portion 130 could disable access to programs 142 after some period of time (e.g., several weeks to a month, as desired) unless the storage portion 130 re-authenticates with transcoder 122 and/or authorization service 107 to prevent portion 130 from becoming a medium of content transfer. Further, access to the personal network 158 may be limited to an appropriate number of simultaneous users, each of whom may register with a password to prevent unfettered access to content 142 on storage 137. Other embodiments may provide alternate or additional features, as desired.

Referring now to FIG. 2, an exemplary process 200 to securely deliver transcoded media files to one or more media player clients suitably includes the broad steps of selecting media content (function 207), obtaining and transcoding the selected content (functions 214 and 216), storing the transcoded media files 142 in storage 137 (function 224), providing a personal network 158 from the portable storage device 130 (function 230), and securely providing requested program content to media players 150 via personal network 158 (function 240). These basic functions may be supplemented as desired to improve security, functionality and convenience to the user as desired.

As noted above, many embodiments will restrict access to stored content 142 by ensuring that media player clients 150 are authorized to receive content. To that end, portable device 130 and/or each media player 150 receiving content 142 from device 130 will typically register with an authentication authority 107 (functions 201, 202). In various embodiments, the authentication authority 107 could be an Internet or other network service operated by a media content provider or other service provider. In other embodiments, however, the authentication authority 107 may be incorporated into a set top box, network device and/or other content source 105, provided that the device providing the authority 107 is built with adequately secure hardware and software to prevent unauthorized access or tampering. In the illustrated embodiment, media player 150 registers with the portable device 130 (function 202), which then forwards the registration request to the authentication authority 107 (function 203) for approval. In some implementations, registrations 201, 203 occur when the portable device 130 is connected to the transcoding device 120; in other embodiments, storage device 130 contacts the authentication authority 107 directly, as desired.

Authentication authority 107 verifies that the user, media player 150 and/or storage device 130 are approved to receive content 142. If so, the authority 107 issues an approval 204 that can be stored in secure storage of the portable device 130 (function 205). Portable device 130 will typically store a copy of a player ID or other credential that is uniquely associated with each approved media player 150, and will forward a copy of the credential to the player itself for use in subsequent authentication (function 206). Credential 211 may include digital cryptographic data generated by the portable device 130, by transcoder 120, by media player 150 itself, by authentication service 107, and/or by any combination of these sources. Credentials assigned to storage device 130 and/or media players 150 may be renewed on any temporal basis (e.g., weekly, monthly, etc.) if desired to prevent improper use of content stored on storage device 130. Re-authentication of storage device 130 and/or media players 150 with authorization service 107 from time-to-time can prevent unauthorized long-term transfers of content stored on the device 130, if desired.

Content stored on portable device 130 may be selected in any manner. In various embodiments, one or more users select content for storage on device 130 using an authenticated media player 150 (function 207). In such embodiments, content available from one or more program sources 105 may be listed for the user, who is then able to select specific contents for transcoding and storage on device 130. The program list may be provided via an electronic program guide (EPG) or similar listing available from a network service, from one or more content sources 105, and/or from any other source. In various embodiments, a client application executing on media player 150 displays program guide data and other listings of available programming for place-shifting, recording, viewing or other functions. The user is allowed to select one or more programs and, using any suitable interface features, to direct that the selected program be transcoded and stored on the portable device 130 (function 208). In such embodiments, a network service (e.g., service 107 or another service on network 108) receives the program selection from media player 150 and directs content source 105 to deliver the selected program to transcoder 120 for storage on device 130. In other embodiments, the media player 150 communicates directly with a set top box, DVR or other content source 105 to select and retrieve programs for transcoding and storage.

Transcoder 120 therefore discovers and obtains media content from one or more content sources 105 using any appropriate techniques (function 212). Rather than receiving programs selected by a user, for example, some implementations could alternately or additionally allow transcoder 120 to automatically communicate with the various content sources 105 to identify and transfer some or all of the programming available from that device (function 214). That is, the transcoder 120 could use any process or algorithm to automatically select content to store on device 130, as desired. The content discovery and delivery process may be automated in any manner and/or users may manually direct the transfer of programs to for transcoding and storage in any other manner, as desired.

Transcoding of received media content (function 216) suitably involves placing the content in an appropriate digital format for storage and retrieval as described herein. In various embodiments, transcoding may involve compressing broadcast or downloaded video data, converting to video formats that are compatible with media players 150 and/or personal network 158, encrypting the video prior to storage, and/or other functions as desired.

In some embodiments, storage device 130 authenticates with the transcoder 120 prior to receiving the transcoded content 142 (function 218). This authentication may involve providing a digital code or other identifier as desired. Transcoder 120 may confirm the authorization with authentication system 107, if desired (function 220, 221). Authentication may not be required prior to every video transfer, but regular re-authentication of the portable device 130 can prevent the device 130 from becoming a medium of content transfer in some embodiments.

If the authentication is successful, then transcoder 120 provides the transcoded video content to portable device 160 (function 222). Transcoder 120 also provides any cryptographic keys or other data necessary for processing DRM/PRM of the transcoded programs 142. Keys may be stored in a secure memory associated with processor 132, as appropriate. Transcoded programs 142 are placed in storage 137 for transport and subsequent retrieval, as appropriate (function 224).

When the portable device 130 is in use, it suitably provides its own Wi-Fi zone or other appropriate personal wireless network 158, as described above (function 230). In various embodiments, portable device 130 acts as a wireless access point (WAP) or other host that serves data to one or more media players 150 via a private wireless network 158 that is restricted to authorized media players 150. To that end, media players 150 suitably request access to the personal network 158 (function 232), and portable device 130 provides network addresses or other credentials necessary for participation in personal network 158 (function 233). In various embodiments, media players 150 provide passwords or other credentials prior to receiving access to the private network 158. Credentials may include the player ID previously received from the portable device 130 during the earlier registration. In such embodiments, portable device 130 may compare the received credentials with the stored credentials to perform an off-line authentication of the media player 150 even when authentication server 107 is not available (function 235). Portable device 130 may restrict the total number of media players 150 that have simultaneous access to the personal network 158, as desired, to prohibit mis-use of content stored on the device 130 or for other purposes. Portable device 130 may also reject media players 150 that have outdated credentials. By requiring media players 150 to refresh their credentials with the authentication authority 107 from time to time, additional forms of mis-use can be prevented.

The media player 150 requests the content list 143 (function 234) that describes the transcoded programs 142 held in storage 137 (function 236). The user appropriately selects a program 142 to view (function 238), and the selected program is provided to the media player 150 over personal network 258 in an appropriate manner (function 240). As noted above, different embodiments could deliver the selected program 142 as a media stream, as a side-loaded file transfer, or in any other manner. As noted above, a portable device 130 could readily provide separate video feeds to multiple simultaneous users. This could allow, for example, multiple family members to simultaneously watch separate programs on their own media players 150.

The various security mechanisms shown in FIG. 2 can be used to preserve the integrity of transcoded programs delivered to the media player. In contrast to conventional file sharing systems in which media files are simply stored without restriction, various embodiments use digital credentials to securely provide stored programs only to those media players that have been previously authenticated and approved to receive such data. Additional embodiments could further enhance the security of the system by requiring the portable device 130 and/or media players 150 to periodically renew their credentials, by limiting the number of media players 150 that are able to access the storage device, to limit the number of simultaneous connections to private network 158, and/or by taking other actions as appropriate. Through the use of digital cryptography and/or other access controls, content stored on device 130 may be limited to playback on one or more media players 150, or certain programs may be associated with certain players while other programs remain accessible by other players 150. Further, the storage device 130 could be uniquely associated with a particular transcoder 120 and/or data source 105, as desired. Still other embodiments could require that the storage device 130 be interfaced with transcoding device 120 and/or content source 105 while authentication of the storage device 130 and/or one or more media players 150 takes place. Additional or other constraints may be imposed to further enhance the security of the system as desired.

Although FIG. 2 and the discussion herein often refers to the "transcoding portion 120" and the "storage portion 130" as separate devices, other embodiments could combine the transcoder and storage portions within a common housing or chassis to make a portable transcoder device with delivery capabilities, as noted at the outset. Other embodiments will implement the storage function 130 in a separate device that cooperates with an transcoder 122 provided in a set top box, television receiver, placeshifting device, video recording device, standalone network transcoder and/or the like. Many different variations could be formulated in a wide array of equivalent embodiments.

The term "exemplary" is used herein to represent one example, instance or illustration that may have any number of equivalent alternatives. Any implementation described herein as "exemplary" is not necessarily to be construed as preferred or advantageous over other possible implementations. While several example embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. A portable device to deliver video content to at least one media player device, the portable data processing system comprising:
   a transcoder configured to receive video content and to transcode the received video content into a format that is suitable for delivery to the at least one media player device over a personal wireless network:
   a data interface to communicate via an external network:
   a data storage configured to store the transcoded video content;
   a wireless network interface configured to provide a wireless access point to the that hosts a personal wireless network; and
   a processor configured to receive a digital credential identifying the at least one media player device via the data interface connected to the external network, wherein the digital credential is issued by an authenticator service accessible via a wide area network separate from the personal wireless network, to store the digital credential received from the authenticator service, to issue addresses on the personal wireless network to the at least one media player device, to receive subsequent connection requests comprising digital credentials from the at least one media player device via the personal wireless network and, in response to the subsequent connection requests, to verify that the at least one media player device is authorized to receive the transcoded video content by comparing the digital credentials received from the at least one media player via the personal wireless network to the digital credentials previously received from the authenticator service even though the external network is no longer available, and to deliver the transcoded video content to the at least one media player device via the personal wireless network if the digital credentials received from the at least one media player device via the personal wireless network match the digital credentials previously received from the authenticator service via the wide area network, and otherwise not delivering the transcoded video content to the at least one media player device via the personal wireless network.

2. The portable device of claim 1 wherein the transcoded video content is encrypted prior to storage on the portable device, and wherein the processor is further configured to decrypt the transcoded video content prior to delivering the transcoded video content to the at least one media player.

3. The portable device of claim 1 wherein the personal wireless network is an IEEE 802.11 network hosted by the portable device.

4. The portable device of claim 1 wherein the format that is suitable for delivery to the at least one media player is a streaming video format.

5. The portable device of claim 4 wherein the portable device is configured to simultaneously deliver multiple video streams of the transcoded video content to multiple media player devices via the personal wireless network.

6. The portable device of claim 1 further comprising a battery configured to provide electrical power to the data storage, the wireless network interface and the processor during delivery of the video content to the at least one media player.

7. A method executable by a portable video storage device to deliver video content to a media player, the method comprising:
  receiving a digital credential from an authentication service at the portable video storage device via a first digital network, wherein the digital credential identifies the media player;
  storing transcoded video content in a data storage of the portable video storage device;
  providing a wireless access point to a personal wireless network by the portable video storage device, wherein the personal wireless network is separate from the first digital network and wherein the portable video storage device issues an address on the personal wireless network to the media player device;
  receiving a connection request from the media player at the portable video storage device via the personal wireless network, wherein the connection request comprises the digital credential identifying the media player; and
  verifying that the media player is authorized to receive the transcoded video content by comparing the digital credential received from the media player via the personal wireless network to the digital credential previously received from the authentication service though the data interface even though the first digital network is no longer available; and
  if the digital credential received from the media player via the personal wireless network matches the digital credential previously received from the authentication service via the first digital network, the portable video storage device providing the transcoded video content from the portable video storage device to the media player device via the personal wireless network, and otherwise not providing the transcoded video content via the personal wireless network.

8. The method of claim 7 further comprising transcoding received video content in a format that is suitable for delivery to the media player over the personal wireless network.

9. The method of claim 7 wherein the transcoded video content is encrypted prior to storage on the portable video storage device, and further comprising decrypting the transcoded video content prior to delivering the transcoded video content to the media player.

10. The method of claim 7 further comprising the portable video storage device issuing an address on the personal wireless network to the media player device if the media player device is authorized to receive the transcoded video content, and otherwise not issuing an address on the personal wireless network to the media player device.

11. The method of claim 10 wherein the transcoded video content is received in a streaming video format, and wherein providing comprises simultaneously delivering multiple video streams of the transcoded video content to multiple media player devices via the personal wireless network.

12. A portable device to deliver video streams to at least one media player device, the portable device comprising:
  a data interface to communicate via an external network;
  a data storage configured to store video content that is transcoded in a video streaming format;
  a wireless network interface configured to provide a wireless access point to the that hosts a personal wireless network; and
  a processor configured to receive a digital credential identifying the at least one media player device via the data interface, wherein the digital credential is issued by an authenticator service accessible via a wide area network separate from the personal wireless network, to store the digital credential received from the authenticator service, to issue addresses on the personal wireless network, to receive subsequent connection requests comprising digital credentials from the at least one media player device via the personal wireless network, to verify that the at least one media player device is authorized to receive the transcoded video content by comparing the digital credentials received from the at least one media player via the personal wireless network to the digital credentials previously received from the authenticator service even though the wide area network is no longer available, and, if the at least one media player device is authorized, to deliver the transcoded video content to the at least one media player device via the personal wireless network, and otherwise not delivering the transcoded video content to the at least one media player device via the personal wireless network.

13. The portable device of claim 12 wherein the data interface is an interface to a transcoder that transcodes the video content into the video streaming format.

14. The portable device of claim 13 wherein the data interface is a universal serial bus (USB) interface that supplies data and electrical power to the portable device.

15. The portable device of claim 14 wherein the processor verifies that the at least one media player device is authorized to receive the transcoded video content even though a connection to the authenticator service is no longer available.

16. The portable device of claim 12 further comprising a battery configured to provide electrical power to the data storage, the wireless network interface and the processor during delivery of the video content to the at least one media player.

17. The portable device of claim 12 wherein the portable device is configured to simultaneously deliver multiple video streams of the transcoded video content to multiply media player devices via the personal wireless network.

* * * * *